(12) United States Patent
Ogawa et al.

(10) Patent No.: US 8,911,586 B2
(45) Date of Patent: Dec. 16, 2014

(54) ONE LIQUID TYPE CYANATE-EPOXY COMPOSITE RESIN COMPOSITION

(75) Inventors: Ryo Ogawa, Saitama (JP); Shinsuke Yamada, Saitama (JP); Mitsunori Ide, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/001,461

(22) PCT Filed: Jun. 12, 2009

(86) PCT No.: PCT/JP2009/002681
§ 371 (c)(1),
(2), (4) Date: Dec. 27, 2010

(87) PCT Pub. No.: WO2009/157147
PCT Pub. Date: Dec. 30, 2009

(65) Prior Publication Data
US 2011/0095453 A1    Apr. 28, 2011

(30) Foreign Application Priority Data

Jun. 27, 2008    (JP) .................................. 2008-169454

(51) Int. Cl.
*B28B 1/00*    (2006.01)
*C08L 63/00*    (2006.01)

(52) U.S. Cl.
USPC ........................... 156/330; 264/319; 525/523

(58) Field of Classification Search
USPC ............ 524/236; 156/330; 264/319; 525/523
See application file for complete search history.

(56) References Cited

U.S. PATENT DOCUMENTS

| 6,469,074 B1 | 10/2002 | Hino et al. |
| 6,632,523 B1 | 10/2003 | Rosenfeld et al. |

FOREIGN PATENT DOCUMENTS

| JP | 60-250026 A | 12/1985 |
| JP | 63-90531 A | 4/1988 |
| JP | 9-52941 A | 2/1997 |
| JP | 2000-191776 A | 7/2000 |
| JP | 2001-172473 A | 6/2001 |
| JP | 2001-302767 A | 10/2001 |
| JP | 2004-511587 A | 4/2004 |
| JP | 2007-204669 A | 8/2007 |
| WO | WO 0226888 A2 | 4/2002 |

OTHER PUBLICATIONS

Machine translation of JP 2007-204669. Aug. 2007.*
Machine translation of JP 2001-172473. Jun. 2001.*
Machine translation of JP 09-052941. Feb. 1997.*
International Search Report of PCT/JP2009/002681 Date of Completion Aug. 18, 2009, Date of Mailing Sep. 8, 2009, Japanese Patent Office.

* cited by examiner

*Primary Examiner* — John Uselding
(74) *Attorney, Agent, or Firm* — Millen, White, Zelano & Branigan, P.C.

(57) ABSTRACT

The present invention is one liquid type cyanate-epoxy composite resin composition that is comprised of cyanate ester resin (A), epoxy resin (B) and latent curing agent (C) and has high thermal resistance as well as excellent fast curing properties and storage stability, characterized in that the above latent curing agent is comprised of a modified amine compound (a) and a phenol resin (b). Where, the modified-amine compound (a) is obtained by the reaction of at least one kind of amine compounds (a-1), selected from amine compounds having one or more tertiary amino groups and one or more primary and/or secondary amino groups, with an epoxy compound (a-2), in particular. It is preferable that one liquid type cyanate-epoxy composite resin composition of the present invention contains 1-10,000 mass parts of the epoxy resin component of the component (B) relative to 100 mass parts of cyanate-ester resin component of the component (A). The using amount of the latent curing agent of the component (C) is preferred to be 1-100 mass parts relative to 100 mass parts of the whole components (A) and (B).

14 Claims, No Drawings

ONE LIQUID TYPE CYANATE-EPOXY COMPOSITE RESIN COMPOSITION

FIELD OF THE INVENTION

The present invention relates to one liquid type cyanate-epoxy composite resin composition, particularly to one liquid type cyanate-epoxy composite resin composition comprised of cyanate ester resin, epoxy resin and specific latent curing agent and having excellent fast curing properties as well as excellent storage stability.

BACKGROUND OF THE INVENTION

An epoxy composite resin composition has excellent electric performance and adhesive strength. Therefore, it has been used for various fields of electricity and electronics in the past. In a case where a sufficient thermal resistance properties can not be obtained even when using an epoxy resin alone or in mixture, a high thermal resistant cyanate-epoxy composite resin compositions comprised of mixing epoxy resin with cyanate ester resin are commonly used as sealing materials of semiconductors or used for moldings such as base board for electronic circuits etc.

However, liquid epoxy composite resin compositions used for sealing semiconductors comprised of, for example, cyanate ester, epoxy resin, inorganic filler and dihydrazide compound etc. (Patent document 1) had disadvantages in that curing agents against cyanate ester and epoxy resin may be sometimes required respectively, and also a high curing temperature or long curing time was required.

In addition, it is proposed that an amine type curing agent is used for the composite composition which contains cyanate ester and epoxy resin (Patent document 2). However, in this case, there was a disadvantage in that sufficient storage stability was not obtained (Patent document 2).

Furthermore, in a case of a thermosetting resin composition wherein a latent curing agent containing imidazole component is used for cyanate ester and epoxy resin, the amount of cyanate resin used should be limited to obtain sufficient stability (Patent document 3). Thus, a satisfactory thermosetting resin composition has not been obtained yet.

PRIOR ART DOCUMENTS

Patent Documents

Patent document 1: Japanese Unexamined Patent Publication Tokkai 2001-302767
Patent document 2: Japanese Unexamined Patent Publication Tokkai-sho 60-250026
Patent document 3: Japanese Unexamined Patent Publication Toku hyo 2001-506313

SUMMARY OF THE INVENTION

Problems to be Solved by the Invention

Therefore, the first object of the present invention is to provide one liquid type cyanate-epoxy composite resin composition having high thermal resistance properties as well as excellent storage stability and fast curing properties.

The second object of the present invention is to provide cured materials which can be widely used for coating materials or adhesive agents or the like and in particular can be effectively used as sealing materials to protect semiconductors or electronic materials to bond electric parts and automobile materials.

Furthermore, the third object of the present invention is to provide a method for manufacturing a molded product wherein the resin composition of the present invention can be cured inside the mold.

Means to Solve the Problems

As a result of extensive studies, the inventors of the present invention found that extremely good results can be obtained when cyanate-epoxy composite resin composition comprised of cyanate ester resin, epoxy resin and latent curing agent containing a modified amine compound, obtained by the reaction of an amino compound having one or more tertiary amino groups and one or more primary and/or secondary amino groups within a molecule with an epoxy compound, and a phenol resin is used, thereby achieving the present invention.

Namely, the present invention is one liquid type cyanate-epoxy composite resin composition characterized in that the said composite resin composition is comprised of (A) cyanate ester resin, (B) epoxy resin and (C) latent curing agent, wherein the said latent curing agent is comprised of a modified amine compound (a) obtained by a reaction of at least one kind of amine compound (a-1), selected from the amine compounds having one or more tertiary amino groups and one or more primary and/or secondary amino groups, with an epoxy compound (a-2) and a phenol resin (b), cured materials characterized in that it is obtained by polymerization-curing of the said resin composition, and also sealing materials and adhesive agents characterized by consisting of the said resin composition, and further a method for manufacturing molded products characterized in that the said resin composition is cured inside the mold.

It is preferable that the above amine compound (a-1) is the amine compound represented by the following general formulae (I), (II) or (III).

General formula (I)

(I)

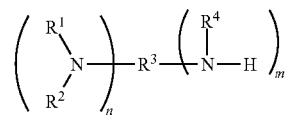

$R^1$ and $R^2$ in the above general formula (I) are each independently an alkyl group having 1-10 carbon atoms, an alkyl group which contains an oxygen atom, a nitrogen atom or a sulfur atom, or an alkylene group formed by bonding the above $R^1$ and $R^2$ each other. $R^3$ is a hydrocarbon group with a valency of (m+n). $R^4$ is a hydrogen atom or an alkyl group having 1-10 carbon atoms, or an alkyl group which contains an oxygen atom, a nitrogen atom or a sulfur atom. n is 1, 2 or 3 and m is 1 or 2.

General formula (II)

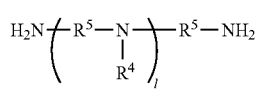
(II)

$R^4$ in the above general formula (II) is identical to $R^4$ in the above general formula (I). $R^5$ is each independently an alkylene group having 1-10 carbon atoms or an alkylene group, which contains an oxygen atom, a nitrogen atom or a sulfur atom. l is an integer of 1-10.

General formula (III)

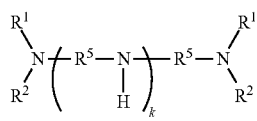
(III)

$R^1$ and $R^2$ in the above general formula (III) are identical to $R^1$ and $R^2$ in the above general formula (I). $R^5$ is identical to $R^5$ in the above general formula (II). k is an integer of 1-10.

It is preferable that the amine compound (a-1) represented by the above general formula (I) is an amine compound represented by the following general formula (I-1).

General formula (I-1)

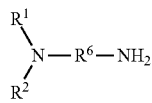
(I-1)

$R^1$ and $R^2$ in the above general formula (I-1) are identical to $R^1$ and $R^2$ in the above general formula (I). $R^6$ represents an alkylene group having 1-10 carbon atoms.

It is preferable that the above modified polyamine compound (a) is a modified polyamine compound obtained by reacting the above epoxy compound (a-2) with the above amine compound (a-1) represented by the above general formula (I-1), wherein the amount of the component (a-2) is used so that epoxy equivalent thereof is 0.5-2 relative to 1 mol of the above amine compound (a-1).

It is preferable that the latent curing agent of the above component (C) contains 10-100 mass parts of phenol resin of the component (b) relative to 100 mass parts of modified amine compound of the above component (a).

It is preferable that the cyanate ester resin represented by the above component (A) is at least one kind of compound selected from a group consisting of the compounds represented by the following general formulae (1) and (2) and their prepolymers.

General formula (1)

(1)

$R^7$ in the above general formula (1) is an unsubstituted or fluorine-substituted bivalent hydrocarbon group, $R^8$ is each independently an unsubstituted phenylene group or a phenylene group substituted by 1-4 alkyl groups.

General formula (2)

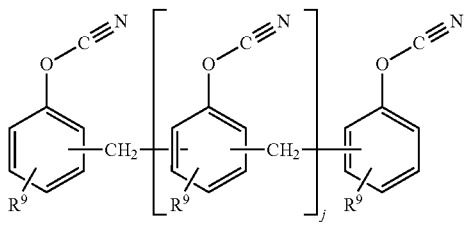
(2)

$R^9$ in the above general formula (2) is a hydrogen atom or an alkyl group having 1-4 carbon atoms. j is an integer of 1-20.

It is preferable that the compound represented by the above general formula (1) is at least one kind of compound selected from the compounds represented by the following general formula (3).

General formula (3)

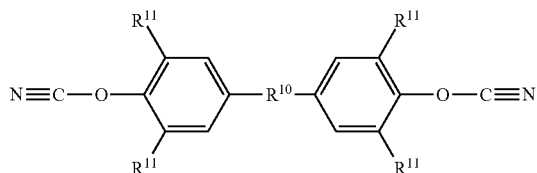
(3)

$R^{10}$ in the above general formula (3) is any of groups represented below.

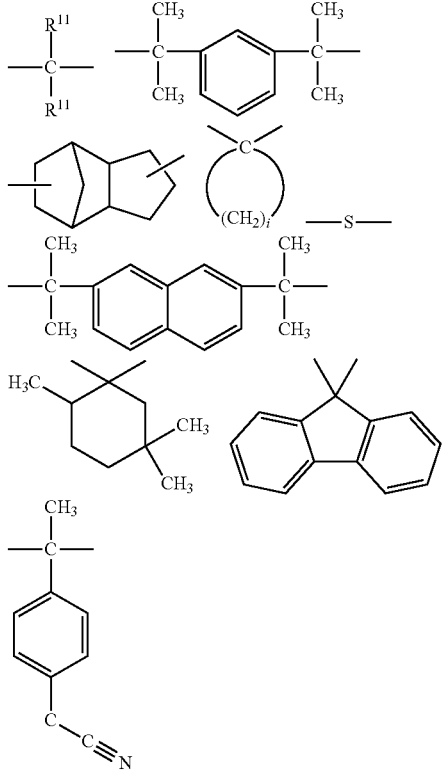

$R^{11}$ in the above general formula (3) is each independently a hydrogen atom or an unsubstituted or fluorine-substituted methyl group. i is an integer of 4-12.

It is preferable that one liquid type cyanate-epoxy composite resin composition of the present invention contains 1-10,000 mass parts of epoxy resin component of the component (B) relative to 100 mass parts of cyanate-ester resin component of the component (A) and the amount of latent curing agent of the component (C) used is 1-100 mass parts relative to the total 100 mass parts of the components (A) and (B).

Effects of the Invention

One liquid type cyanate-epoxy composite resin composition of the present invention has excellent storage stability and fast curing properties. Furthermore, after curing, it becomes a molded product having excellent adhesive strength and high thermal resistance.

BEST MODES FOR CARRYING OUT THE INVENTION

Cyanate ester resin of the component (A) used for one liquid type cyanate-epoxy composite resin composition of the present invention is not particularly limited, but compounds represented by the following general formula (1) or (2) are preferable.

General formula (1)

$$N\!\!=\!\!C\!\!-\!\!O\!\!-\!\!R^8\!\!-\!\!R^7\!\!-\!\!R^8\!\!-\!\!O\!\!-\!\!C\!\!=\!\!N \quad (1)$$

$R^7$ in the above general formula (1) is an unsubstituted or fluorine-substituted divalent hydrocarbon group, $R^8$ is each independently an unsubstituted phenylene group or a phenylene group substituted by 1~4 alkyl groups.

General formula (2)

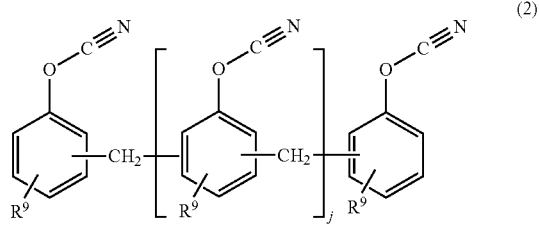

$R^9$ in the above general formula (2) is a hydrogen atom or an alkyl group having 1~4 carbon atoms and j is an integer of 1-20.

Furthermore, the prepolymers comprised of the compound of the above general formula (1) or (2), wherein a part of cyanate group forms a triazine ring, can be used as the component (A). An example of such prepolymers is a compound wherein all or a part of the compounds of the general formula (1) are combined each other to form a trimer.

It is preferable to use compounds represented by the following general formula (3) in particular among compounds represented by the above general formula (1) in the present invention. These cyanate ester resins may be used alone or two or more kinds of them may be used in combination.

General formula (3)

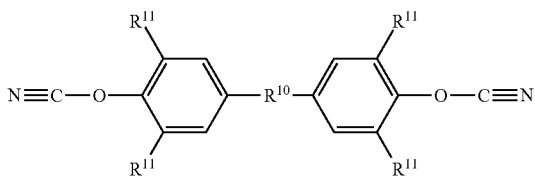

$R^{10}$ in the general formula (3) is any of groups represented below.

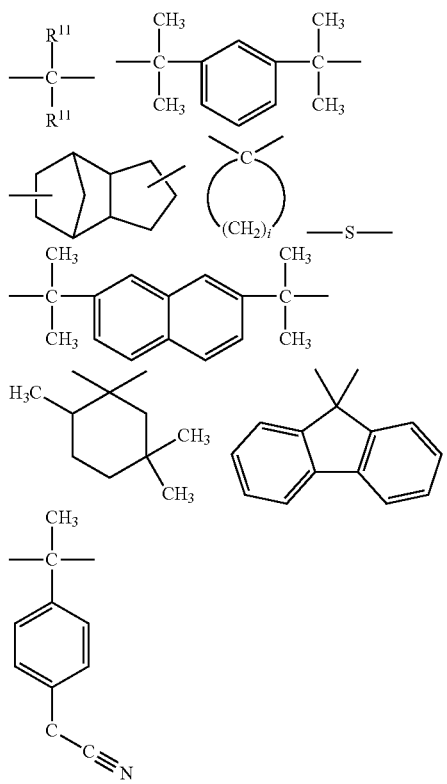

$R^{11}$ in the above general formula (3) is each independently a hydrogen atom or an unsubstituted or fluorine-substituted methyl group. i is an integer of 4-12.

It is preferable in the present invention to use 4,4'-ethylidenebisphenylenecyanate, 2,2-bis(4-cyanatephenyl)propane and bis(4-cyanate-3,5-dimethylphenyl)methane in particular among these compounds.

In the one liquid type cyanate-epoxy composite resin composition of the present invention, examples of epoxy resin used as the component (B) are polyglycidyl ether compounds of mononuclear multivalent phenol compounds such as hydroquinone, resorcin, pyrocatechol and phloroglucinol; polyglycidyl ether compounds of multinuclear multivalent phenol compounds such as dihydroxy naphthalene, bisphenol, methylenebisphenol (bisphenol F), methylene bis(orthocresol), ethylidene bisphenol, isopropylidene bisphenol (bisphenol A), isopropylidene bis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, orthocresol novolac, ethylphenol novolac, butylphenol novolac, octylphenol novolac, resorcin novolac and terpenephenol; polyglycidyl ether compounds of polyalcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition compounds; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, endomethylene tetrahydrophthalic acid and homopolymers or copolymers of glycidyl methacrylate; epoxy compounds having glycidylamino groups such as N,N-diglycidyl aniline, bis(4-(N-methyl-N-glycidylamino)phenyl)methane, diglycidyl ortho-toluidine; epoxidized compounds of cyclic olefin compounds such as vinylcyclohexene diepoxide, dicyclopentanediene diepoxide, 3,4-epoxy cyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidylisocyanurate.

These epoxy resins may be internally cross-linked by prepolymers having terminal isocyanate or may be high-molecularized by multivalent compounds having an active hydrogen (multivalent phenol, polyamine, carbonyl group-containing compound and polyphosphate ester or the like).

It is preferable that the epoxy equivalent of epoxy resin (B) used in the present invention is 70~3,000, and 90~2,000 is more preferable. Curing properties may decrease when the epoxy equivalent is less than 70, on the other hand, sufficient physical properties of coating may not be obtained when the epoxy equivalent is more than 3,000, which is not preferable.

The latent curing agent of the component (C) contained in the one liquid type cyanate-epoxy composite resin composition of the present invention contains the modified amine compound (a), obtained by a reaction of the amine compound (a-1) with the epoxy compound (a-2), and the phenol resin (b).

The amine compound used as the above component (a-1) is at least one kind of amine compound having one or more tertiary amino groups together with one or more primary and/or secondary amino groups, and it is preferable that it is a compound represented by the following general formulae (I), (II) or (III).

General formula (I)

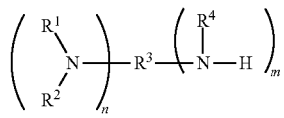

$R^1$ and $R^2$ in the above general formula (I) are each independently an alkyl group having 1-10 carbon atoms, an alkyl group which contains an oxygen atom, a nitrogen atom or a sulfur atom, or an alkylene group formed by bonding the above $R^1$ with $R^2$. $R^3$ is a hydrocarbon group having a (m+n) valency. $R^4$ is a hydrogen atom or an alkyl group having 1-10 carbon atoms, or an alkyl group which contains an oxygen atom, a nitrogen atom or a sulfur atom. n is 1, 2 or 3 and m is 1 or 2.

General formula (II)

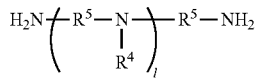

$R^4$ in the above general formula (II) is identical to $R^4$ in the above general formula (I). $R^5$ is each independently an alkylene group having 1-10 carbon atoms or an alkylene group which contains an oxygen atom, a nitrogen atom or a sulfur atom. l is an integer of 1-10.

General formula (III)

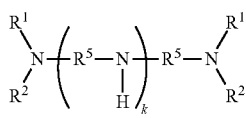

$R^1$ and $R^2$ in the above general formula (III) are identical to $R^1$ and $R^2$ in the above general formula (I). $R^5$ is identical to $R^5$ in the above general formula (II). k is an integer of 1-10.

Examples of amine compound represented by the above general formula (I) are N,N-dimethylaminoethylamine, N,N-diethylaminoethylamine, N,N-diisopropylaminoethylamine, N,N-diallylaminoethylamine, N,N-benzylmethylaminoethylamine, N,N-dibenzylaminoethylamine, N,N-cyclohexylmethylaminoethylamine, N,N-dicyclohexylaminoethylamine, N-(2-aminoethyl)pyrrolidine, N-(2-aminoethyl)piperidine N-(2-aminoethyl)morpholine, N-(2-aminoethyl)piperazine, N-(2-aminoethyl)-N'-methyl piperazine, N,N-dimethylaminopropylamine, N,N-diethylaminopropylamine N,N-diisopropylaminopropylamine N,N-diallylaminopropylamine, N,N-benzylmethylaminopropylamine, N,N-dibenzylaminopropylamine, N,N-cyclohexylmethylaminopropylamine, N,N-dicyclohexylaminopropylamine, N-(3-aminopropyl)pyrrolidine, N-(3-aminopropyl)piperidine, N-(3-aminopropyl)morpholine, N-(3-aminopropyl)piperazine, N-(3-aminopropyl)-N'-methylpiperidine, 4-(N,N-dimethylamino)benzylamine, 4-(N,N-diethylamino)benzylamine, 4-(N,N-diisopropylamino)benzylamine, N,N-dimethylisophoronediamine, N,N-dimethylbisaminocyclohexane, N,N,N'-trimethylethylenediamine, N'-ethyl-N,N-dimethylethylenediamine, N,N,N'-trimethylethylenediamine, N'-ethyl-N,N-dimethylpropanediamine and N'-ethyl-N,N-dibenzylaminopropylamine or the like.

Examples of amine compound represented by the above general formula (II) are N,N-(bisaminopropyl)-N-methylamine, N,N-bisaminopropylethylamine, N,N-bisaminopropylpropylamine, N,N-bisaminopropylbutylamine, N,N-bisaminopropylpentylamine, N,N-bisaminopropylhexylamine, N,N-bisaminopropyl-2-ethylhexylamine, N,N-bisaminopropylcyclohexylamine, N,N-bisaminopropylbenzylamine and N,N-bisaminopropylallylamine or the like.

Examples of amine compound represented by the above general formula (III) are bis [3-(N,N-dimethylaminopropyl)]

amine, bis[3-(N,N-diethylaminopropyl)]amine, bis[3-(N,N-diisopropylaminopropyl)]amine and bis[3-(N,N-dibutylaminopropyl)]amine or the like.

It is preferable to use the compounds represented by the following general formula (I-1) in particular among the amine compounds represented by the above general formulae (I)-(III) in order to obtain the one liquid type cyanate-epoxy composite resin composition excellent in balance of curing properties and storage stability.

General formula (I-1)

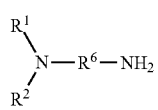

(I-1)

$R^1$ and $R^2$ in the above general formula (I-1) are identical to those of the above general formula (I). $R^6$ is an alkylene group having 1-10 carbon atoms.

Examples of amine compound represented by the above general formula (I-1) are N,N-dimethylaminoethylamine, N,N-diethylaminoethylamine, N,N-diisopropylaminoethylamine, N,N-dibenzylaminoethylamine, N,N-cyclohexylmethylaminoethylamine, N,N-dicyclohexylaminoethylamine, N-(2-aminoethyl)pyrrolidine, N-(2-aminoethyl)piperidine N-(2-aminoethyl)morpholine, N-(2-aminoethyl)piperazine, N-(2-aminoethyl)-N'-methyl piperazine, N,N-dimethylaminopropylamine, N,N-diethylaminopropylamine, N,N-diisopropylaminopropylamine, N,N-diallylaminopropylamine, N,N-benzylmethylaminopropylamine, N,N-dibenzylaminopropylamine, N,N-cyclohexylmethylaminopropylamine, N,N-dicyclohexylaminopropylamine, N-(3-aminopropyl)pyrrolidine, N-(3-aminopropyl)piperidine, N-(3-aminopropyl)morpholine, N-(3-aminopropyl)piperazine and N-(3-aminopropyl)-N'-methylpiperidine.

It is preferable to use N,N-dimethylaminopropylamine or N,N-diethylaminopropylamine among them.

Examples of epoxy compounds used as the component (a-2) in the one liquid type cyanate-epoxy composite resin composition of the present invention are monoglycidyl ether compounds such as phenylglycidyl ether, allylglycidyl ether, methylglycidyl ether, butylglycidyl ether, secondary butylglycidyl ether, 2-ethylhexylglycidyl ether, 2-methyloctylglycidyl ether and stearylglycidyl ether; a monoglycidyl ester compound such as a versatic acid glycidyl ester; polyglycidyl ether compounds of mononuclear multivalent phenol compounds such as hydroquinone, resorcin, pyrocatechol and phloroglucinol; polyglycidyl ether compounds of polynuclear multivalent phenol compounds such as dihydroxy naphthalene, biphenol, methylenebisphenol (bisphenol F), methylenebis(orthocresol), ethylidene bisphenol, isopropylidene bisphenol (bisphenol A), isopropylidenebis (orthocresol), tetrabromo bisphenol A, 1,3-bis(4-hydroxy cumylbenzene), 1,4-bis(4-hydroxy cumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, orthocresol novolac, ethylphenolnovolac, butylphenol novolac, octylphenol novolac, resorcin novolac and terpenephenol; polyglycidyl ether compounds of polyalcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition products; glycidyl esters of aliphatic, aromatic or alicyclic polyacids such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesin acid, pyromellitic acid, tetrahydrophthalic acid, hexahydrophthalic acid, endomethylene tetrahydrophthalic acid and homopolymers or copolymers of glycidylmethacrylates; epoxy compounds having glycidylamino groups such as N,N-diglycidyl aniline, bis (4-(N-methyl-N-glycidylamino)phenyl)methane and diglycidyl orthotoluidine; epoxidized compounds of cyclic olefin compounds such as vinylcyclohexenediepoxide, dicyclopentanedienediepoxide, 3,4-epoxycyclohexylmethyl-3,4-epoxycyclohexanecarboxylate, 3,4-epoxy-6-methylcyclohexylmethyl-6-methylcyclohexanecarboxylate and bis(3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidylisocyanurate.

It is preferable to use polyglycidyl ether compounds having two or more epoxy groups within a molecule as epoxy compounds used as the component (a-2) in the present invention. In particular it is preferable to use polyglycidyl ether compounds of bisphenol compounds such as methylenebisphenol (bisphenol F), methylenebis(orthocresol), ethylidene bisphenol, isopropylidene bisphenol (bisphenol A) and isopropylidenebis(orthocresol).

It is preferable that the modified polyamine compound (a) used in the present invention is obtained by the reaction of the component (a-2) with 1 mol of the component (a-1) wherein the amount of the component (a-2) is used so that epoxy equivalent thereof is 0.2-3, and more preferably 0.5-2.

In particular, when the polyamine compound represented by the general formula (I-1) as the component (a-1) is used, it is preferable that the epoxy equivalent of the whole component (a-2) is 0.5-2 equivalent relative to 1 mol of the component (a-1). 0.8-1.5 equivalent is more preferable.

In the present invention, different modified amine compounds may be combined as the component (a-1).

Phenol resins contained in the latent curing agent (C) as the component (b), used for the present invention, are phenol resins synthesized with phenols and aldehydes. Examples of the above phenols are phenol, cresol, ethylphenol, n-propylphenol, isopropylphenol, butylphenol, tert-butylphenol, octylphenol, nonylphenol, dodecylphenol, cyclohexylphenol, chlorophenol, bromophenol, resorcin, catechol, hydroquinone, 2,2-bis(4-hydroxyphenyl)propane, 4,4'-thiodiphenol, dihydroxydiphenylmethane, naphthol, terpenephenol and phenolized dicyclopentadiene. The example of the above aldehydes is formaldehyde.

It is preferable that the number average molecular weight of the phenol resin of the component (b) is 750~1,200 from a viewpoint of obtaining excellently balanced storage stability and curing properties in the one liquid type cyanate-epoxy composite resin composition.

It is preferable that the amount of the component (b) used in the latent curing agent (C) is 10~100 mass parts relative to 100 mass parts of the component (a), in particular 20~60 mass parts is more preferable. When it is less than 10 mass parts, sufficient curing properties cannot be obtained and when it is more than 100 mass parts, the physical properties of the cured material decline, which is not preferable.

As for the amount of components (A) and (B) used in one liquid type cyanate-epoxy composite resin composition of the present invention, it is preferable that the amount of component (B) is 1~10,000 mass parts relative to 100 mass parts of component (A) and 10~1,000 mass parts are more preferable, and 20~500 mass parts are optimal.

It is preferable that the amount of component (C) used in one liquid type cyanate-epoxy composite resin composition of the present invention is 1~100 mass parts relative to the total amount of 100 mass parts of components (A) and (B). 5~60 mass parts are more preferable.

Furthermore, it is preferable that the total amount of components (A), (B) and (C) is 50 mass % or more of one liquid type cyanate-epoxy composite resin composition of the present invention.

One liquid type cyanate-epoxy composite resin composition of the present invention can be dissolved in a various types of solvents in order to make its treatment easy when used. Examples of these solvents are ethers such as tetrahydrofuran, 1,2-dimethoxyethane and 1,2-diethoxyethane; alcohols such as iso-or n-butanol, iso-or n-propanol, amyl alcohol, benzyl alcohol, furfuryl alcohol and tetrahydrofurfuryl alcohol; ketones such as methyethylketone, methylisopropylketone and methylbutylketone; aromatic hydrocarbons such as benzen, toluene and xylene; triethylamine, pyridine, dioxane, and acetonitrile or the like.

It is preferable that the amount of the above organic solvents used is 0~200 mass parts relative to the total amount of 100 mass parts of components (A), (B) and (C), 0~40 mass parts is more preferable. When the amount of the organic solvents used is more than 200 mass parts, it is harmful as well as dangerous due to volatilization, which is not preferable.

One liquid type cyanate-epoxy composite resin composition of the present invention may contain fillers or pigments such as glass fiber, carbon fiber, cellulose, siliceous sand, cement, kaolin, clay, aluminum hydroxide, bentonite, talk, silica, fine powder silica, titanium dioxide, carbon black, graphite, iron oxide and bituminous substance; thickners; thixotropic agents; flame retardants; defoamers; fungus resistance agents; and commonly used additives such as colloidal silica and colloidal alumina, if necessary. In addition, sticky resins such as xylene resin and petroleum resin may be used together.

One liquid type cyanate-epoxy composite resin composition of the present invention will now be described in more detail referring to manufacturing examples and examples, but the present invention should not be limited by these descriptions.

MANUFACTURING EXAMPLE 1

Manufacture of Latent Curing Agent (EH-1)

130 g of N,N-dimethylaminopropylamine was introduced into a flask and heated to 80° C., then 213 g of the ADEKA RESIN EP-4100E (Commercial name of the product manufactured by ADEKA CORPORATION; it is a bisphenol A type epoxy resin, and its epoxy equivalent is 190) was added little by little, keeping the temperature within the system at 100~110° C. The epoxy equivalent of the ADEKA RESIN EP-4100E was 1.12 relative to 1 mol of N,N-dimethylaminopropylamine. After the ADEKA RESIN EP-4100E was added, the temperature of the reaction system was raised to 140° C., and a reaction was carried out for 1.5 hours to obtain the modified polyamine. The phenol resin was introduced into the reaction system so that the amount of the phenol resin was 30 g against 100 g of the modified polyamine obtained, then solvent was removed for one hour under the condition of 180~190° C. and 30~40 torr to obtain the latent curing agent (EH-1).

MANUFACTURING EXAMPLE 2

Manufacture of Latent Curing Agent (EH-2)

The amine of the above Manufacturing Example 1 was changed to 100 g of N,N-diethylaminopropylamine, then was reacted with 213 g of the ADEKA RESIN EP-4100E (Commercial name of the product manufactured by ADEKA CORPORATION; it is a bisphenol A type epoxy resin, and its epoxy equivalent is 190) to obtain modified polyamine in the same manner as Manufacturing Example 1. The epoxy equivalent of the ADEKA RESIN EP-4100E was 1.12 relative to 1 mol of N,N-diethylaminopropylamine The phenol resin was introduced into the reaction system so that the amount of the phenol resin was 30 g against 100 g of the modified polyamine obtained, then solvent was removed for one hour under the condition of 180~190° C. and 30~40 torr to obtain the latent curing agent (EH-2).

MANUFACTURING EXAMPLE 3

Manufacture of Latent Curing Agent for Comparison (EH-3)

The amine of the above Manufacturing Example 1 was changed to 100 g of m-xylylenediamine, and was reacted with 213 g of the ADEKA RESIN EP-4100E (Commercial name of the product manufactured by ADEKA CORPORATION; it is a bisphenol A type epoxy resin, and its epoxy equivalent is 190) to obtain modified polyamine in the same manner as Manufacturing Example 1. The epoxy equivalent of the ADEKA RESIN EP-4100E was 1.53 relative to 1 mol of m-xylylenediamine. The phenol resin was introduced into the reaction system so that the amount of the phenol resin was 30 g against 100 g of the modified polyamine obtained, then solvent was removed for one hour under the condition of 180~190° C. and 30~40 torr to obtain the latent curing agent for comparison (EH-3).

EXAMPLES AND COMPARATIVE EXAMPLES

Cyanate ester resin (Cyanate LeCy: Commercial name of the product manufactured by Lonza Co.: CE), epoxy resin (EP-4901E: Commercial name of the product manufactured by ADEKA CORPORATION: it is a bisphenol F type epoxy resin and its epoxy equivalent is 168: it is represented as EP in the Tables.) and the latent curing agent obtained by the above manufacturing examples 1-3 were blended to obtain the one liquid type cyanate-epoxy composite resin composition.

The following tests were carried out to evaluate concerning the one liquid type cyanate-epoxy composite resin composition obtained. The compounding ratios of each component and test results are shown in Tables 1-3 together.
(Viscosity)

Initial viscosity per 1 rpm at 25° C. and viscosity after leaving for 24 hours at 25° C. as it was were measured by using Brookfield E type rotation viscometer to obtain the ratio of viscosity increase.
(Gel time)

0.5 g of each composition obtained was dropped on a hot plate, and the each composition was mixed with a spatula until the fluidity of the composition disappeared. The time until the fluidity of the composition disappeared was measured, wherein each temperature during measurement was maintained.

(Measurement of Glass Transition Point))

TMA chart was obtained by carrying out a measurement using TMA 6100, which is the machine for measuring heat, stress and strain manufactured by SII Nano Technology Inc., under the condition of 10° C./minute of temperature rising speed and—35-250° C. of scanning temperature range. The glass transition point was calculated from the point of inflection of coefficient of linear expansion.

(Adhesive Properties)

A cylindrical mold with a 2 mm bottom diameter×1.5 mm top diameter×3 mm in height was bonded to a glass epoxy board which was made by impregnate a cloth consisting of layered glass fiber with epoxy resin and a molded product was manufactured by curing at specified temperature and time. Under the atmosphere of the specified temperature, the pressure was put on this molded product from the side at the rate of 5 mm/sec. to peel off and adhesive strength was measured. The retention ratio was calculated from the following formula.

Retention(%)=(curing condition 120° C.×1 h, adhesive properties at 150° C.)×100/(curing condition 120° C.×1 h, adhesive properties at 23° C.)

TABLE 1

|  | Examples | | Comparative Examples | | |
|---|---|---|---|---|---|
|  | 1-1 | 1-2 | 1-1 | 1-2 | 1-3 |
| Combination | | | | | |
| CE: (A) | 50 | 50 | 0 | 0 | 50 |
| EP: (B) | 50 | 50 | 100 | 100 | 50 |
| EH-1: (C) | 20 | | 20 | | |
| EH-2: (C) | | 20 | | 20 | |
| EH-3: (C) | | | | | 50 |
| Evaluation results | | | | | |
| Initial viscosity (mPa · s) | 650 | 630 | 3150 | 2910 | 8400 |
| 25° C. × 24 hours later Ratio of viscosity rise (%) | 106 | 105 | 108 | 103 | 104 |

TABLE 2

|  | Examples | | | | Comparative Examples | | |
|---|---|---|---|---|---|---|---|
|  | 1-1 | 1-2 | 1-3 | 1-4 | 1-1 | 1-2 | 1-3 |
| Combination | | | | | | | |
| CE: (A) | 50 | 50 | 20 | 80 | 0 | 0 | 50 |
| EP: (B) | 50 | 50 | 80 | 20 | 100 | 100 | 50 |
| EH-1: (C) | 20 | | | | 20 | | |
| EH-2: (C) | | 20 | 20 | 20 | | 20 | |
| EH-3: (C) | | | | | | | 50 |
| Evaluation results | | | | | | | |
| Gel time (sec.) 80° C. | 22 | 33 | 27 | 17 | 90 | 75 | >900 |
| 100° C. | 18 | 20 | 22 | 15 | 45 | 35 | 15 |
| 120° C. | 15 | 16 | 18 | 13 | 35 | 30 | 13 |
| Glass transition point: Tg (° C.) | 112.0 | 113.7 | 88.6 | 127.3 | 65.6 | 67.0 | 103.2 |

TABLE 3

|  | Examples | | Comparative Examples | | |
|---|---|---|---|---|---|
|  | 1-1 | 1-2 | 1-1 | 1-2 | 1-3 |
| Combination | | | | | |
| CE: (A) | 50 | 50 | 0 | 0 | 50 |
| EP: (B) | 50 | 50 | 100 | 100 | 50 |
| EH-1: (C) | 20 | | 20 | | |
| EH-2: (C) | | 20 | | 20 | |
| EH-3: (C) | | | | | 50 |
| Evaluation Results Measured temperature 23° C. (MPa) | | | | | |
| Curing condition: 60° C. × 3 h | 10.7 | 10.4 | Uncuring | Uncuring | Uncuring |
| Curing condition: 80° C. × 1 h | 9.7 | 9.5 | 2.5 | 2.3 | Uncuring |
| Curing condition: 80° C. × 2 h | 11.0 | 10.0 | 10.9 | 10.8 | Uncuring |
| Curing condition: 120° C. × 1 h | 13.0 | 12.7 | 11.4 | 12.5 | 14.3 |
| Measuring temperature 150° C. (MPa) | | | | | |
| Curing condition: 120° C. × 1 h | 8.8 | 8.3 | 4.8 | 5.2 | 9.3 |
| Retention Ratio (%) | 68.1 | 65.0 | 42.0 | 41.9 | 65.0 |

It was confirmed from the results of Tables 2 and 3, that the resin composition (Comparative Examples 1-1 and 1-2), which contains the latent curing agent (EH-1 and 2) obtained by using the amine compound having a secondary amino group or a tertiary amino group but does not contain the component (A), has a low glass transition point and also has low retention ratio as well as adhesive strength in a high-temperature region and was poor in thermal resistance compared with the resin composition containing the said component (A) (Examples, Comparative Examples 1-3).

However, it was confirmed from the results of Tables 1-3 that the resin composition (Comparative Examples 3) containing the latent curing agent (EH-3), which was obtained by not using the amine compound having a secondary amino group or a tertiary amino group, was not only poor in treating properties due to the high initial viscosity but also had extremely low curing properties in a low-temperature region of 80° C. or less.

Furthermore, it was confirmed from the results of Tables 1 and 2 that when the latent curing agents (EH-1 and 2), which were obtained by using the amine compound having a secondary amino group or a tertiary amino group, were used (Examples, Comparative Examples 1-1,2), the initial viscosities dropped and curing properties were realized even in a low-temperature region, however, in the case wherein the cyanate ester resin (A) was not contained (Comparative Examples 1-1 and 1-2), sufficient treating properties and curing properties were not obtained since not only the initial viscosity was higher but also the gel time was longer than the present invention From the above results, it was confirmed that the one liquid type cyanate-epoxy composite resin composition of the present invention had not only excellent storage stability and thermal resistance of a molded product but also excellent curing properties and adhesive properties over a wide range from low temperature to high temperature.

Industrial Availability

One liquid type cyanate-epoxy composite resin composition of the present invention can be widely used for a coating composition against concrete, cement, mortar, various types of metal, leather, glass, rubber, plastic, wood, cloth and paper etc., or for an adhesive agent. In addition, since one liquid type cyanate-epoxy composite resin composition of the present invention has high thermal resistance and excellent adhesive properties in particular, it is suitably used for sealing materials to protect semiconductors, electronic materials to bond electronic parts etc. and furthermore for automobile materials.

What is claimed is:

1. A one liquid type cyanate-epoxy composite resin composition, comprising
   (A) cyanate ester resin,
   (B) epoxy resin and
   (C) latent curing agent,
   wherein
   the amount of the component (B) is 20-500 mass parts relative to 100 mass parts of the component (A),
   the amount of the component (C) is 5-60 mass parts relative to 100 mass parts of the total amount of the components (A) and (B); and
   said latent curing agent (C) comprises a modified amine compound (a), having been obtained by the reaction of at least one kind of aliphatic amine compound (a-1) represented by formula (I-1) with a polyglycidyl ether compound of polynuclear multivalent phenol compound (a-2), and having been mixed with a phenol resin (b);

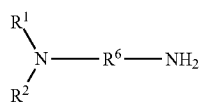
(I-1)

wherein
$R^1$ and $R^2$ are each independently an alkyl group having 1-10 carbon atoms, and
$R^6$ is an alkylene group having 1-10 carbon atoms,
and
said component (C) contains 20-60 mass parts of the component (b) relative to 100 mass parts of modified amine compound of the said component (a), and
component (a) and component (b) having been mixed together to prepare component (C) before component (C) having been mixed with components (A) and (B).

2. The one liquid type cyanate-epoxy composite resin composition described in claim 1, wherein the modified amine compound (a) is obtained by the reaction of component (a-2) with component (a-1) represented by formula (I-1), wherein the amount of component (a-2) is such that epoxy equivalent thereof is 0.5-2 equivalent against 1 mol of component (a-1).

3. The one liquid type cyanate-epoxy composite resin composition described in claim 1, wherein the cyanate ester resin of component (A) is at least one kind of compound of formula (1) or (2) or a prepolymer thereof formula (1)

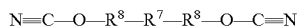  (1)

wherein
$R^7$ is an unsubstituted or fluorine-substituted bivalent hydrocarbon group,
$R^8$ are each independently an unsubstituted phenylene group or a phenylene group substituted by 1-4 alkyl groups, formula (2)

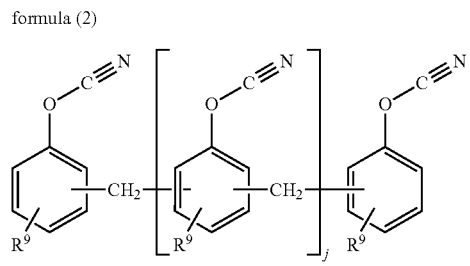
(2)

wherein
$R^9$ are each a hydrogen atom or an alkyl group having 1-4 carbon atoms, and
j is an integer of 1-20.

4. The one liquid type cyanate-epoxy composite resin composition described in claim 3, wherein the compound of formula (1) is at least one kind of compound of formula (3)

formula (3)

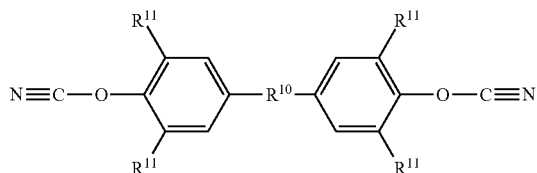
(3)

wherein
$R^{10}$ is one of the following groups

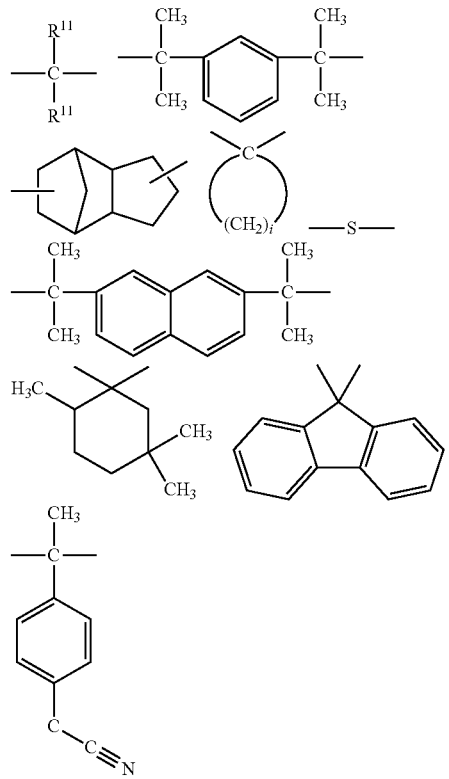

$R^{11}$ are each independently a hydrogen atom or an unsubstituted or fluorine-substituted methyl group, and
i is an integer of 4-12.

5. A cured material, which has been formed by polymerization-curing of the resin composition described in claim 1.

6. A sealing material, which contains the resin composition described in claim 1.

7. An adhesive agent, which contains the resin composition described in claim 1.

8. A method for manufacturing a molded product, comprising curing the resin composition described in claim 1 inside a mold.

9. A method for sealing a product, comprising applying to said product a resin composition described in claim 1.

10. A method for adhering two products, comprising applying to at least one of said products a resin composition described in claim 1 and contacting said products to each other to form an adherent bond.

11. The one liquid type cyanate-epoxy composite resin composition described in claim 1, wherein the epoxy compound (a-2) and phenol resin (b) are not identical compounds.

12. The one liquid type cyanate-epoxy composite resin composition described in claim 1, wherein the amount of the component (C) is 20 mass parts relative to 100 mass parts of the total amount of the components (A) and (B).

13. The one liquid type cyanate-epoxy composite resin composition described in claim 1, wherein component (C) is dimethyl aminopropyl amine.

14. The one liquid type cyanate-epoxy composite resin composition described in claim 12, wherein component (C) is dimethyl aminopropyl amine.

* * * * *